Aug. 12, 1969  C. L. WANLASS  3,461,376
AC SOLID STATE VOLTAGE REGULATOR
Filed Feb. 14, 1966  3 Sheets-Sheet 1

INVENTOR.
CRAVENS L. WANLASS
BY
ATTORNEYS

Aug. 12, 1969          C. L. WANLASS          3,461,376

AC SOLID STATE VOLTAGE REGULATOR

Filed Feb. 14, 1966          3 Sheets-Sheet 3

INVENTOR.
CRAVENS L. WANLASS
BY Lyon & Lyon
ATTORNEYS

# United States Patent Office 3,461,376
Patented Aug. 12, 1969

3,461,376
AC SOLID STATE VOLTAGE REGULATOR
Cravens L. Wanlass, Santa Ana, Calif., assignor to Wanlass Electric Company, Santa Ana, Calif., a corporation of California
Filed Feb. 14, 1966, Ser. No. 527,208
Int. Cl. G05f 1/40, 1/52, 1/60
U.S. Cl. 323—22                                21 Claims

ABSTRACT OF THE DISCLOSURE

An AC voltage regulator in which a plurality of diodes are used to direct current in the proper direction through an asymmetrically conducting device such as a transistor regardless of the instantaneous polarity of the AC voltage. The asymmetrically conducting device acts as a series regulator and is controlled by a feedback circuit which compares the output voltage with a reference voltage and causes the asymmetrically conducting device to reduce conduction or clip when the output voltage exceeds a predetermined level. The feedback circuit is connected across the asymmetrically conducting means so that its energizing voltage is derived from the voltage drop across the asymmetrically conducting means.

---

This invention relates to a voltage regulator and more particularly relates to a transistorized AC voltage regulator and variation thereof.

Voltage regulators, both AC and DC, are used in many present day electrical and electronic systems. As is the case with other electronic circuits, it is often desired that such voltage regulators be as compact, rugged and inexpensive as possible, as well, of course, as being precise in their regulation. The use of all solid state components, e.g., transistors and diodes, has been relatively commonplace in DC regulators for a number of years. However, AC regulators have generally been dependent on a bipolar device such as a saturable reactor as a regulating element. This has increased the cost, size, weight and complexity of said systems. The cost and complexity of such systems is further increased by the need for DC voltage to power the control circuitry. This is usually either provided by means of a separate DC source such as a battery or by placing a rectifying circuit across the line. The former expedient is not generally satisfactory because of the size and limited life of the battery, while the second results in additional power consumption and heat generation, as well as increased cost and circuit complexity.

It is therefore an object of the present invention to provide a regulating circuit using all solid state components.

It is also an object of the present invention to provide a voltage regulator that is accurate, has a very rapid response time, and is relatively inexpensive.

It is another object of the present invention to provide an AC voltage regulator utilizing a single, solid-state, series regulating element.

It is still another object of the present invention to provide an AC voltage regulator that is not line frequency sensitive.

It is yet another object of the present invention to provide an AC voltage regulator wherein the voltage drop across the series regulating element is used to power the DC control circuitry.

It is a further object of the present invention to provide such an AC voltage regulator for maintaining a constant peak voltage output.

It is a still further object of the present invention to provide such an AC voltage regulator that provides a constant RMS as the voltage output.

It is another object of the present invention to provide an AC voltage regulator that can serve as a sine wave regulator or a dynamic line filter.

It is a further object of the present invention to provide a DC power supply utilizing as a first stage an AC voltage regulator.

It is a yet further object of the present invention to provide a DC to AC voltage inverter with sine wave output wave form and AC regulation of the output.

These and other objects and advantages of the present invention will become more apparent upon reference to the accompanying description and drawings in which:

Figure 1:
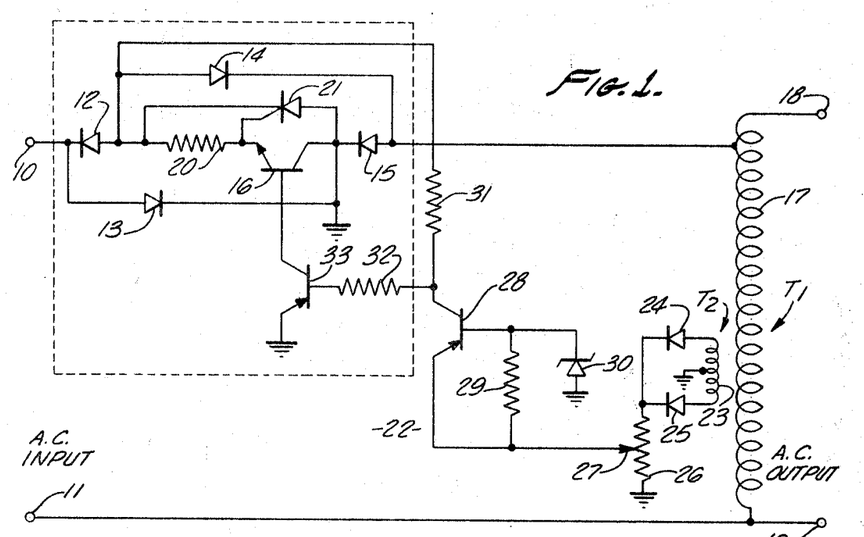
FIGURE 1 is a schematic diagram of an AC peak voltage regulator according to the present invention.

Turning now to FIGURE 1, an improved AC voltage regulator is illustrated. The AC input signal applied to the input terminals 10 and 11 is passed through a diode bridge made up of power diodes 12, 13, 14 and 15 which insure that regardless of whether the positive half-cycle or negative half-cycle of the input is present, the current is always passed through an NPN power transistor 16 in the same direction. The collector of the transistor 16 is grounded. The output of the power transistor 16, which serves as a series regulating element, is connected to a tap on the winding 17 of an autotransformer $T_1$ which steps up the output voltage to make up for the drop across the regulating transistor 16. As illustrated, a very small resistor 20 is connected in series with the transistor 16, and the anode to cathode path of a silicon controlled rectifier (SCR) 21 is connected across the series combination of the transistor 16 and the resistor 20. The gate electrode of the SCR 21 is connected to the junction of the emitter of the transistor 16 and the resistor 20. The SCR 21 serves as a protector for the transistor in the event that the output is shorted, or the load current increases above that which the regulating circuit is designed to carry. In such a case, the drop across the resistor 20 becomes great enough to fire the SCR 21 which shorts the transistor. If desired, a fuse can also be used in the line so that if a direct short of the output occurs, the SCR 21 will only be required to carry the current until the fuse opens the line circuit. If desired, both the resistor 20 and the SCR 21 can be deleted with no effect on the normal operation of the circuit.

The winding 17 of the transformer $T_1$ serves as the primary of a transformer $T_2$ which supplies the signal to the feedback circuit 22. The secondary winding 23 of transformer $T_2$ has its end connected to diodes 24 and 25 and its center tap grounded to form a full wave rectifier, the output of which is applied across a potentiometer 26. The wiper 27 of the potentiometer 26 is coupled to the emitter of a PNP transistor 28 and to the base of the transistor 28 by a resistor 29. The base of the transistor 28 is also coupled to ground by a Zener diode 30. The full wave rectifier circuit provides the Zener diode with a voltage of proper polarity regardless of the instantaneous polarity of the input voltage.

The collector of the transistor 28 is connected through a resistor 31 to the junction of the diode 12 and resistor 20 and is also connected through a resistor 32 to the base of a second PNP transistor 33, the emitter of which is grounded and the collector of which is connected to the base of the power transistor 16. As can be seen, the collector-emitter path of the transistor 28 is connected across the transistor 16 so that the voltage drop across the transistor 16 serves as the DC voltage supply or B+ for transistor 28. Thus, the control circuitry is only energized when a sufficient voltage drop is present across transistor 16 and no separate supply is needed.

The operation of the circuit illustrated in FIGURE 1 is as follows. As the instantaneous voltage increases due to the sine wave nature of the voltage, the voltage developed across potentiometer 26 and hence across the Zener diode 30 becomes positive enough to cause it to break down and hold the base voltage of the transistor 28 at a constant value. As the output voltage continues to increase, the conduction of the transistor 28 increases and causes the normally conducting transistor 33 to decrease its conduction. This causes the current to the base of transistor 16 to decrease which in turn causes the transistor 16 to conduct less and thus to reduce or hold the peak voltage of the output at a constant amplitude.

This operation continues to maintain the peak output voltage at the desired value until the instantaneous value of the sine wave input voltage decreases to a value that allows the output voltage to fall below the desired peak level at which time the transistor 28 is cut off and stops conducting. Cutoff of transistor 28 allows the transistor 33 to conduct fully and deliver sufficient current to the base of transistor 16 to cause it to saturate and conduct fully. On the next half-cycle, the same operation occurs except that the current path goes through the opposite pair of power diodes, that is, either diodes 13 and 14 or diodes 15 and 12. For this circuit, it is important that the feedback voltage be applied to the emitter of transistor 28 and the reference voltage established at its base so that this transistor can be cut off for low instantaneous values of the input sine wave voltage. This is desired so that transistor 33 is fully conducting and transistor 16 saturated at these low values.

As will be obvious, the setting of the wiper 27 of the potentiometer 26 adjusts the magnitude of the peak voltage to the value desired. The transistor 33 serves as an amplifier and is normally sufficient but if additional amplification is necessary, it can be provided by inserting an emitter follower circuit in the base of transistor 16. If desired, all the PNP transistors can be changed to NPN transistors and all NPN transistors changed to PNP transistors by reversing all the diodes in the circuit. If desired, a transformer can be used in place of the autotransformer $T_1$, or this autotransformer may be removed entirely.

If the peak output voltage tends to increase due to an instantaneous change in load or line input voltage, the voltage applied to the emitter of transistor 28 becomes more positive with the result that the transistor 28 conducts more heavily since its base voltage is held constant by Zener diode 30. The increased conduction of transistor 28 causes the voltage drop across resistor 31 to increase which in turn causes the base of transistor 33 to go more positive, causing this transistor to conduct less. This caues regulating power transistor 16 to conduct less which in turn causes the output voltage to decrease toward the desired peak voltage. This process continues until the desired peak output voltage is again present at the output terminal of the regular. If the input voltage or output load changes such as to cause a reduced output voltage during the time of the cycle that the regulator has a voltage drop across it, just the opposite of the process just described occurs and the votlage is restored to the desired original value.

If a regulated DC voltage is desired, it can be provided by substituting a transformer in place of autotransformer $T_1$ and rectifying and filtering the output of the transformer. The flat top of the waveform caused by the peak voltage regulator is ideal from a filtering standpoint and thus the ripple voltage on the output DC voltage is much less than it would be for a normal sine wave waveform for the same size filtering capacitor.

If desired, two power transistors connected in series may be used in place of the single power transistor 16. In such an event, two separate feedback circuits identical to the feedback circuit 22 shown in FIGURE 1 are provided, each of the feedback circuits controlling one of the series transistors. Instead of the full wave rectifier shown in connection with the transformer $T_2$ of FIGURE 1, each of the feedback circuits receives its signal from a separate secondary winding with oppositely poled half-wave rectifiers. By providing these secondaries with the same number of windings and by ganging the potentiometers equivalent to the potentiometer 26, the detected output voltage on each half-cycle will be approximately equal. Instead of the four diodes 12–15 shown in FIGURE 1, only two power diodes are necessary, each of the diodes being connected across one of the transistors and being poled in the opposite direction of current flow from its respective transistor.

Figure 2:
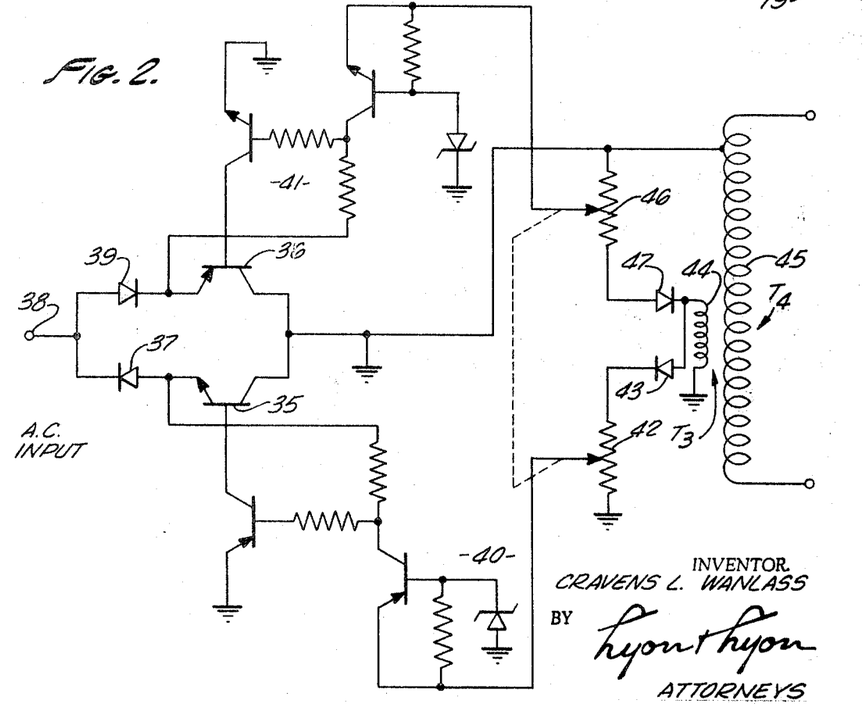
FIGURE 2 is a schematic diagram of a modification of the circuit of FIGURE 1.

Turning now to FIGURE 2, there is shown an AC regulating circuit wherein two power transistors, an NPN transistor 35 and a PNP transistor 36, are connected in parallel. The NPN transistor 35 is connected in series with a power diode 37 so that if the instantaneous voltage at the input terminal 38 is negative the transistor 35 will conduct but if it is positive, current through the transistor 35 will be blocked. The PNP transistor 36 is connected in series with a power diode 39 which permits the transistor 36 to conduct when the instantaneous voltage at the input terminal 38 is positive but which blocks current when the instantaneous input at the terminal 38 is negative. As can be seen, each of the transistors 35 and 36 is provided with a feedback circuit 40 and 41 respectively which are identical to the feedback circuit 22 of FIGURE 1.

The input to the feedback circuit 40 is provided by a potentiometer 42 connected in series with a diode 43 across the secondary winding 44 of a transformer $T_3$, the primary of which is the winding 45 of an autotransformer $T_4$. Thus, when the instantaneous input voltage at the terminal 38 is negative, a voltage will be developed across the potentiometer 42 and the transistor 35 will be regulating.

The input to the the feedback circuit 41 is taken across a potentiometer 46 which is connected in series with a diode 47 which in turn is connected to the winding 44. When the instantaneous input voltage at the terminal 38 is positive, a voltage will be developed across the potentiometer 46 and the transistor 36 will be regulating. By ganging the wipers of the potentiometers 42 and 46, the same peak voltage value may be selected for each half-cycle of the output voltage.

The use of two series regulating transistors can also be accomplished by providing one transistor in each input line, that is, coupled to each of the input terminals, and selecting the transistors so that they will carry current on opposite half-cycles of the input voltage. Separate feedback circuits identical to the circuit 22 of FIGURE 1 are provided for each transistor, each of the feedback circuits receiving its input from a half-wave rectifier poled to conduct only on the proper half-cycle and with the potentiometers of the circuits ganged so that the same peak voltage is set by each feedback circuit. In order to prevent current from passing through the series transistors in the wrong direction, each of them is shunted by a power diode poled in the direction opposite to the direction of proper current flow through the transistor.

Figure 3:
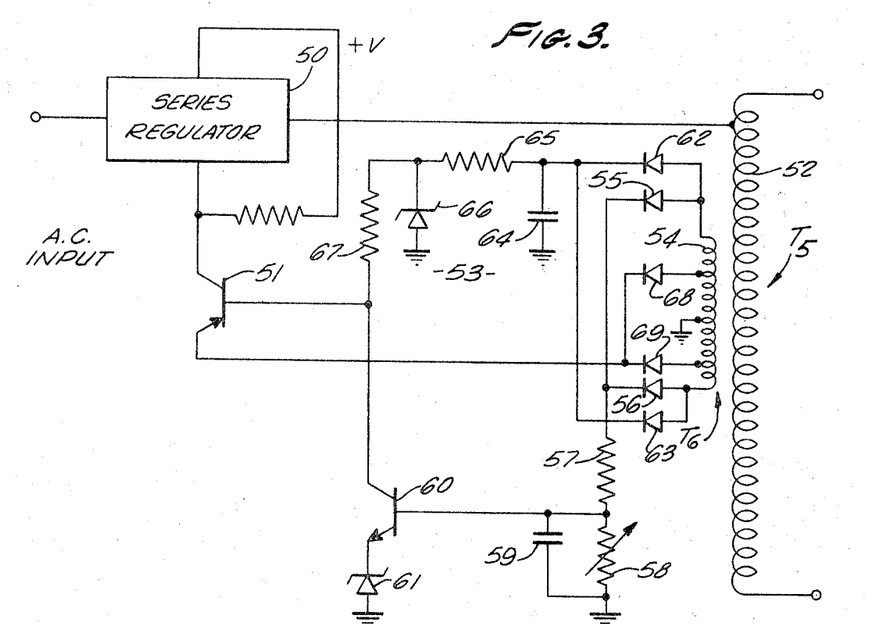
FIGURE 3 is a schematic diagram of an RMS voltage regulator according to the present invention.

Turning now to FIGURE 3, there is illustrated an AC voltage regulator generally similar to that of FIGURE 1 but which provides RMS and average voltage regulation. Since the details of the series regulating transistor and power diodes are identical to those enclosed by the dotted lines in FIGURE 1, they are illustrated in FIGURE 3 merely as a box labelled "Series Regulator." The input to the series regulator 50 is the output of a PNP transistor 51 which is equivalent to the transistor 28 of FIGURE 1 and receives its supply voltage in the same manner. The waveform at the output terminals of a peak regulating circuit has a form such that an average sensing RMS calibrated voltmeter and a true RMS sensing RMS voltmeter read essentially the same. Thus, an average sensor may be employed to provide feedback to the control circuit that will then regulate with reference to the RMS voltage. In other words, the average content of the waveform is approximately a linear function of the RMS content of the waveform. In FIGURE 3, the output of the circuit is taken across the winding 52 of an autotransformer $T_5$, the winding 52 also serving as a primary winding of a transformer $T_6$ which provides the input to the feedback circuit 53.

The voltage developed across the secondary winding 54 of the transformer $T_6$ is rectified by diodes 55 and 56 and impressed across a voltage divider made up of resistor 57 and variable resistor 58. A capacitor 59 is connected across the resistor 58 and this network serves to detect the average output voltage and impresses it on the base of an NPN transistor 60. The transistor 60 is normally conducting and has its emitter connected to ground through a Zener diode 61 which establishes a reference potential against which the output is compared. The supply voltage for the transistor 60 is taken from the winding 54, rectified by diodes 62 and 63, filtered by the capacitor 64 and resistor 65 and maintained at a constant value by the Zener diode 66. The collector of the transistor 60 is connected to the junction of the resistor 65 and Zener diode 66 by a resistor 67 and is also connected to the base of the transistor 51. The emitter of transistor 51 is connected to diodes 68 and 69 which are connected across a portion of the center tapped winding 54.

The regulator shown in FIGURE 3 operates similarly to the constant peak voltage regulating circuit of FIGURE 1 with the exception that the peak voltage at which the unit is to regulate is determined by the RMS sensing voltage provided at the base of the transistor 60 and the Zener voltage of Zener diode 61. In this circuit a separate supply for transistor 60 is necessary and the Zener diode must be connected in the emitter circuit because there is always an output from the RMS sensor which must be compared against a reference. Assume first that the circuit is operating and the instantaneous input voltage is such that the regulating transistor has a voltage drop across it and is regulating and the transistor 51 is conducting. Assume now a change in either line input voltage or load current or both so that the output voltage starts to rise above the desired RMS value. Immediately this increase in voltage is applied at the emitter of transistor 51 causing transistor 51 to conduct more. The base of the transistor 51 is held constant for the immediate time since the voltage across capacitor 59 has not yet changed because of the relatively slow response of the RMS sensor circuit. As transistor 51 conducts more the series regulator 50 conducts less which causes the output voltage of the circuit to return to the original peak voltage amplitude. However, the RMS content of this new output voltage has actually increased due to a widening of the waveform at its peak voltage.

This increase in RMS voltage causes the DC output of the average or RMS sensor to increase, that is, the voltage at the capacitor 59 to increase. This increase in positive voltage is applied to the base of the transistor 60 which causes this transistor to conduct more heavily. The increased conduction of the transistor 60 causes the base of the transistor 51 to go more negative. Depending on the state of conduction of the transistor 51, this decrease in its base voltage can have two results. First, if the transistor 51 is conducting at the time due to the instantaneous voltage of the input being such that the regulator 50 is operating, the transistor 51 conducts more which in turn causes the series regulator 50 to conduct less and the instantaneous output voltage to decrease. If, on the other hand, the transistor 51 is not conducting at the time because of the instantaneous voltage of the input being such that the series regulator 50 is saturated and in a sense not operating, the base of the transistor 51 is held more negative than before and thus this transistor conducts earlier in the cycle and causes an effective decrease in the output peak voltage due to this earlier conduction.

Actually, because the time constant of the RMS or average sensor is greater than one-half cycle (usually it is a number of cycles), both of the foregoing conditions occur before the output peak voltage is again stabilized. The result is that the peak voltage is adjusted by the RMS sensor until the RMS content of the new output voltage is equal to that of the waveform before the increase in input voltage occurs. The peak voltage of the stabilized output is less than the original peak voltage because of its being wider at its peak value.

The regulator of FIGURE 3 has a very fast response time with reference to regulating peak voltage. This is important since no regulation transients occur. In addition, the instantaneous peak regulation causes an immediate reduction in the percentage of output RMS voltage change compared to the RMS input voltage change. Thus, a great reduction in output variations due to input variations occur even before the RMS sensor determines the error. The slower RMS sensor then causes a change in the peak voltage amplitude to accomplish the complete regulation. The output has a good waveform and changes in output current have little effect upon the waveform shape. Since average calibrated RMS and true RMS meter outputs are about the same for this wave shape, the simple average sensor illustrated may be used instead of a more complicated true RMS sensor.

Figure 4:
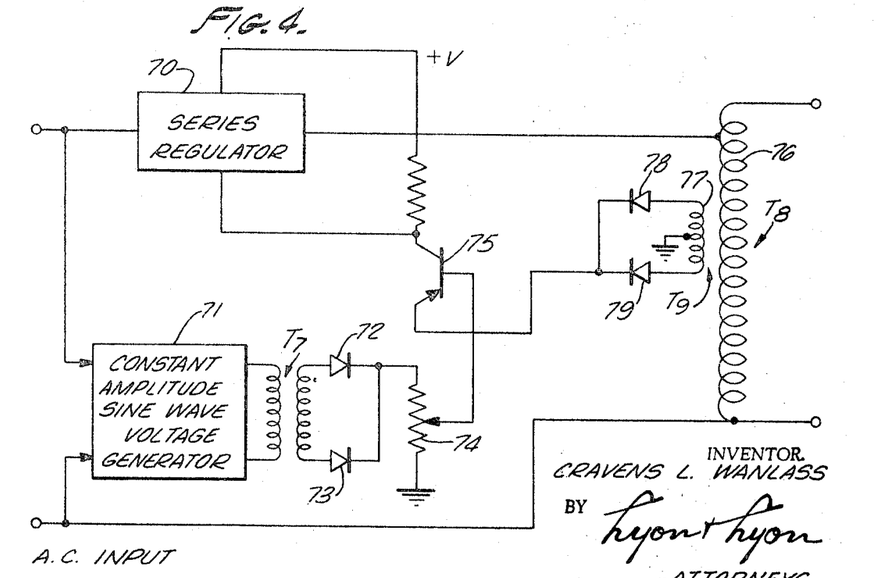
FIGURE 4 is a schematic diagram of a sine wave regulator or dynamic filter according to the present invention.

In FIGURE 4 there is illustrated a sine wave voltage regulator having a very rapid response. As was the case in FIGURE 3, the series transistor and its associated circuitry is arranged in a manner identical to that of FIGURE 1 and thus the details are not again shown. In the regulator of FIGURE 4, the reference voltage is provided by a constant amplitude sine wave voltage generator 71, which delivers a constant RMS voltage with a low distortion sine wave waveform in synchronism with the line voltage. The output of the sine wave generator is passed through transformer $T_7$, rectified by diodes 72 and 73 and impressed across a potentiometer 74. The wiper of the potentiometer 74 is connected to the base of PNP transistor 75 which is equivalent to the transistor 28 of FIGURE 1 and the transistor 51 of FIGURE 3.

The output of the circuit is taken across the winding 76 of an autotransformer $T_8$ as was the case in the previous embodiment. The winding 76 also serves as the primary of the transformer $T_9$. The voltage induced in the secondary 77 of the transformer $T_9$ is rectified by diodes 78 and 79 and applied to the emitter of the transistor 75. The collector of the transistor 75 is connected to the series regulator in the same manner as in FIGURE 1.

The circuit of FIGURE 4 operates as follows. The constant RMS voltage delivered by the sine wave generator 71 is rectified py diodes 72 and 73 so that the voltage applied to the base of the transistor 75 will always be positive in polarity. The potentiometer 74 is adjusted to select the desired output voltage or multiplying factor of the output voltage as referred to reference voltage. If the output voltage increases, this increase is passed to the emitter of the transistor 75 causing this transistor to conduct more heavily. This causes the series regulator 70 to conduct less thereby reducing the output voltage. The use of the sine wave generator output voltage as the reference forces the instantaneous output voltage to be a direct function of the reference voltage at each instant in time. As a result of this, the basic regulator circuit shown in FIGURE 4 may also be employed as a filter to remove noise such as SCR spikes, motor brush noise, and the like, from the line voltage. This is possible because of the very fast response time of the circuit and the use of a separate reference sine wave which does not contain the line noises in its output.

If desired, a sine wave reference voltage may be produced by merely removing noise from the line by filtering and using the filtered voltage to supply the primary of the transformer $T_7$. By using a variable transformer in place of the autotransformer $T_8$, the potentiometer 74 can be set at the desired level to eliminate noise of polarity opposite to that of the input waveform and the output voltage can be set at the desired amplitude by means of the variable transformer. Noise of the same polarity as the input voltage, regardless of amplitude or position on the waveform, can be removed as long as the noise amplitude is not greater than the maximum collector voltage of the power transistor used as a series regulating element.

Figure 5:
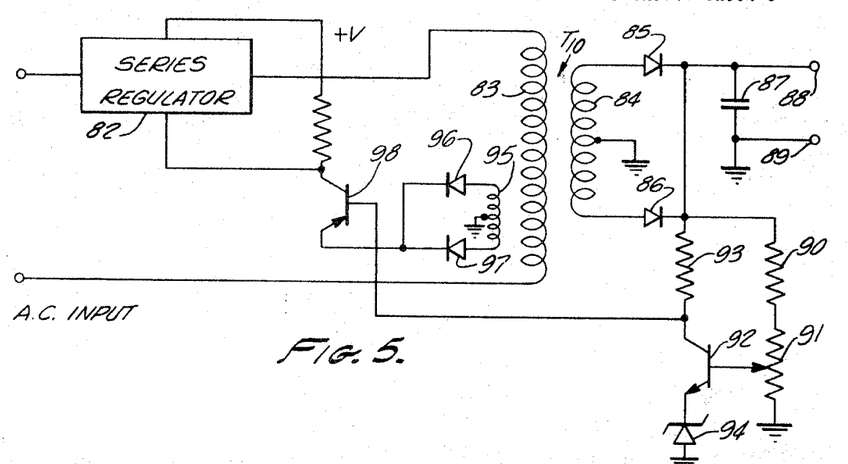
FIGURE 5 is a schematic diagram of a regulated DC power supply utilizing the AC regulator of the present invention.

Turning now to FIGURE 5, there is shown a regulated DC power supply. As was the case with FIGURES 3 and 4, the regulating transistor and its associated circuitry is shown in block form as a series regulator 82. The output of the series regulator is developed across the primary winding 83 of a transformer $T_{10}$. The voltage induced in the secondary winding 84 of the transformer $T_{10}$ is rectified by diodes 85 and 86, filtered by a capacitor 87 and presented to the output terminals 88 and 89. The rectified output of the secondary 84 is also impressed across a voltage divider comprising a resistor 90 and a potentiometer 91 and is also connected to the collector of an NPN transistor 92 by a resistor 93. The emitter of the transistor 92 is connected to ground through a Zener diode 94.

The transformer $T_{10}$ is provided with a further secondary winding 95, the output of which is rectified by diodes 96 and 97 and impressed on the emitter of a PNP transistor 98 which is equivalent to the transistor 28 of FIGURE 1. The base of the transistor 98 is connected to the collector of the transistor 92.

The operation of the above-described DC power supply is as follows. If a change in line voltage or load occurs which tends to cause the DC output voltage to increase, this increase causes the base of transistor 92 to go more positive with the result that this transistor conducts more, the emitter of the transistor being maintained at a reference voltage by the Zener diode 94. Increased conduction of the transistor 92 causes the voltage at the base of the transistor 98 to go more negative and it conducts more heavily and the series regulator 82 conducts less heavily. The decrease in conduction of the series regulator 82 causes a decrease in the voltage delivered to the primary 83 of transformer $T_{10}$ with a resulting decrease in output voltage delivered to the filter capacitor 87 and output terminals 88 and 89. This also causes the voltage at the base of the transistor 92 to decrease. This process continues until the circuit again reaches stability and the output DC voltage is returned to the desired original amplitude.

Figure 6:
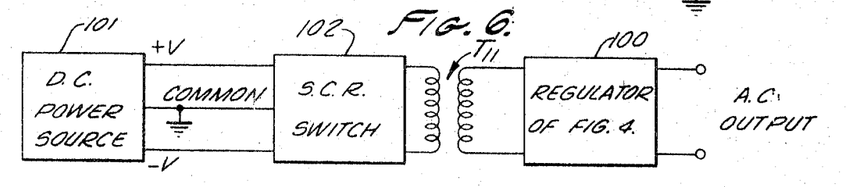
FIGURE 6 is a block diagram of a DC–AC voltage inverter utilizing the sine wave regulator of FIGURE 4.

FIGURE 6 illustrates in block diagram form a DC to AC voltage inverter which produces a sine wave output waveform with AC regulation of the output. This inverter utilizes the regulator circuit shown in FIGURE 4, and rather than duplicate this circuit in the drawings, it is indicated by the block 100. The input to the regulator 100 is provided by a plus and minus DC power source 101 and an SCR or other type switch 102 which converts the DC output of the power source 101 into a square wave. The output of the SCR switch is passed to a transformer $T_{11}$ which provides the input for the regulator 100. A plus and minus DC source is used so that the transformer does not have a DC component in the primary. However, a single polarity source can be used if desired. The circuit of FIGURE 6 operates like the dynamic filter or sine wave output regulator of FIGURE 4 except that the input to the regulator 100 is a square wave. The dynamic filter or regulator 100 clips the square wave input such that the output is a sine wave controlled by the sine wave generator in the regulator 100.

Figure 7:
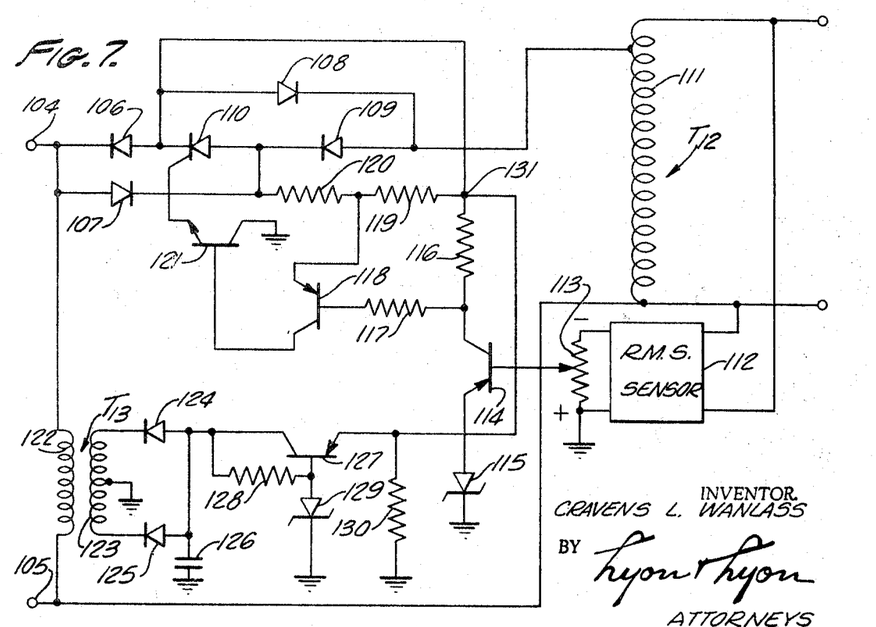
FIGURE 7 is a schematic diagram of an RMS voltage regulator using a silicon controlled rectifier as a series regulating element.

Turning now to FIGURE 7, there is shown an AC voltage regulator that utilizes a silicon controlled rectifier (SCR) as the series regulating element instead of the transistor shown in the previous figures. In this circuit, the AC input signal applied to the input terminals 104 and 105 is passed through a diode bridge made up of diodes 106, 107, 108 and 109 which causes the current to be always passed through the silicon controlled rectifier 110 in the proper direction, regardless of whether the positive half-cycle or negative half-cycle of the input is present. The output of the SCR 110 is connected to a tap on the winding 111 of an autotransformer $T_{12}$. The output of the circuit is taken across the winding 111.

An RMS sensor 112 of conventional design is connected across the output of the transformer $T_{12}$ and acts to produce a DC voltage proportional to the RMS content of the output voltage. This DC voltage is impressed across a potentiometer 113. The wiper arm of the potentiometer 113 is coupled to the base of a PNP transistor 114 which serves to compare the voltage developed by the RMS sensor 112 with a reference voltage developed by a Zener diode 115 connecting the emitter of the transistor 114 to ground.

The collector of the transistor 114 is connected through resistor 116 to the cathode of the SCR 110. The collector of the transistor 114 is also connected through a resistor 117 to the base of a PNP transistor 118. The emitter of the transistor 118 is connected through a resistor 119 to the cathode of the SCR 110 and is also connected through a very high value resistor 120 to the anode of the SCR 110. The collector of the transistor 118 is connected to the base of an NPN transistor 121 whose collector is grounded and whose emitter is connected to the gate electrode of the SCR 110.

A transformer $T_{13}$ has its primary winding 122 connected across the input terminals. The voltage induced in the secondary winding 123 of the transformer $T_{13}$ is rectified by diodes 124, 125 and filtered by capacitor 126. The rectified and filtered voltage is applied to the collector of a PNP transistor 127 and to the base of transistor 127 through a resistor 128. The base of the transistor 127 is connected to ground through a Zener diode 129. The emitter of the transistor 127 is connected to ground through a resistor 130 and is also connected to the junction point 131 of the resistors 116 and 119.

The operation of the above-described circuit is as follows. Assume that the RMS input voltage is constant and the load is constant. For these conditions, the DC output voltage of the RMS sensor is stabilized at a given value. Assume further that the instantaneous value of the sine wave input is at zero at the beginning of operation. The instantaneous input voltage increases in accordance with its sine wave characteristic. This input voltage is dropped across the SCR 110 because the unit is not conducting and no appreciable output voltage is present. However, the input voltage finally reaches an instantaneous value such that the voltage across resistor 119 is of a sufficient magnitude that the emitter of transistor 118 is driven positive with respect to its base and the transistor 118 begins to conduct. Conduction of transistor 118 causes transistor 121 to conduct which in turn provides current to the gate electrode of the SCR 110 and causes the SCR to fire.

Since the voltage drop across the SCR 110 when it is conducting is very low, essentially all of the input voltage is applied across the transformer $T_{12}$ which in turn supplies the load. The SCR 110 continues to conduct until the instantaneous input voltage drops low enough because of its sine wave nature to cause the SCR to stop conducting due to no sustaining current passing through it. The input voltage then begins its next cycle and the process is repeated.

Assume now that the input voltage has been constant in amplitude long enough for the output voltage to stabilize and that the line input voltage increases or the load current changes so as to cause the output voltage to increase in magnitude. Assuming that the time constant of the RMS sensor 112 is relatively long, the change in output voltage is not immediately presented at the output of the RMS sensor 112 and thus the voltage at the wiper arm of potentiometer 113 does not change. Therefore, the SCR 110 fires when the voltage across it reaches the same magnitude as before the input voltage change occurred and the RMS output voltage increases as a function of this increase in line input voltage. However, as the RMS sensor output voltage rises to indicate this increase in output voltage, the base of the transistor 114 is caused to go more negative, causing this transistor to conduct more heavily.

Heavier conduction of the transistor 114 causes the base of the transistor 118 to be held more positive with the result that the transistor 118 conducts later in the half-cycle of the input sine wave. This in turn causes the SCR 110 to fire later in the half-cycle with the result that the RMS output voltage decreases. This process continues each half-cycle until the RMS output voltage is restored to the original value. The time required for the process of complete restoration to the correct output voltage depends upon the time constant of the RMS sensor 112. For a decrease in line input RMS voltage, just the opposite occurs and the original voltage is again restored.

The transistor 127 and Zener diode 129 together with their associated circuitry are used only to provide a voltage to operate the rest of the control circuitry. The transistor 121 is used only as an amplifier and may be deleted if desired. Obviously, an average or other type sensor may be employed instead of the RMS sensor 112 without departing from the scope of the present invention.

The invention may be embodied in other specific forms not departing from the spirit or central characteristics thereof. The present embodiments are therefore to be considered in all respects as illustrative and not restrictive.

I claim:
1. A regulating circuit comprising:
   an input for receiving an AC voltage;
   an output for delivering an AC voltage;
   asymmetrically conducting means having an input and an output;
   diode means connecting said asymmetrically conducting means between said input and said output, said diode means directing current flow into said input of said asymmetrically conducting means regardless of the instantaneous polarity of said AC voltage;
   means for establishing a DC reference voltage;
   means for developing a DC voltage corresponding to the voltage at said output;
   means for comparing said reference voltage with said developed voltage and producing an error signal;
   transistor means connected to said comparing means and to said asymmetrically conducting means and responsive to said error signal for varying the conduction of said asymmetrically conducting means;
   means for connecting said transistor means across said asymmetrically conducting means whereby the energizing voltage for said transistor means is derived from the voltage drop across said asymmetrically conducting means.

2. The circuit of claim 1 wherein said asymmetrically conducting means comprises a transistor.

3. The circuit of claim 1 wherein said asymmetrically conducting means comprises a controlled rectifier.

4. The circuit of claim 1 wherein said DC voltage developing means develops a voltage corresponding to the peak value of the output voltage.

5. The circuit of claim 1 wherein said DC voltage developing means develops a voltage corresponding to the RMS value of the output voltage.

6. A regulating circuit comprising:
   an input for receiving an AC voltage;
   an output for delivering an AC voltage;
   a first transistor having an input electrode, an output electrode and a control electrode;
     diode means connecting said input electrode with said input and said output electrode with said output, said diode means directing current flow into said input electrode of said transistor regardless of the instantaneous polarity of said AC voltage;
   means connected to said output for developing a DC voltage corresponding to the voltage at said output;
   a second transistor having an emitter, a collector and a base;
   a Zener diode connected to said base for establishing a reference voltage at said base;
   means connecting the emitter of said second transistor to said DC voltage developing means;
   means connecting said collector of said second transistor to said control electrode of said fist transistor whereby the conductivity of said first transistor will be varied in response to variations in voltage at said output; and
   means for connecting the collector-emitter path of said second transistor across said first transistor whereby the energizing voltage for said second transistor is derived from the voltage drop across said first transistor.

7. A regulating circuit comprising:
   an input for receiving an AC voltage;
   an output for delivering an AC voltage;
   asymmetrically conducting means having an input terminal and an output terminal;
   diode means connecting said input terminal with said input and said output terminal with said output, said diode means directing current flow into said input of said asymmetrically conducting means regardless of the instantaneous polarity of said AC voltage;
   means connected to said output for developing a DC voltage corresponding to the RMS value of the voltage at said output;
   a transistor having an emitter, a collector and a base;
   a Zener diode connected to said emitter for establishing a reference potential at said emitter;
   means connecting said base to said voltage developing means;
   means connecting said collector to said asymmetrically conducting means whereby the conduction of said asymmetrically conducting means is varied in response to variations in voltage at said output; and
   means for connecting the collector-emitter path of said transistor across said asymmetrically conducting means whereby the energizing voltage for said transistor is derived from the voltage drop across said asymmetrically conducting means.

8. The circuit of claim 7 wherein said asymmetrically conducting means comprises a transistor.

9. The circuit of claim 7 wherein said asymmetrically conducting means comprises a controlled rectifier and wherein said means for connecting said controlled rectifier to said collector comprises means connected to the gate electrode of said controlled rectifier for varying the firing point of said controlled rectifier.

10. A regulating circuit comprising:
    an input for receiving an AC voltage;
    an output;

a first transistor having an input electrode, an output electrode and a control electrode;
diode means connecting said input electrode with said input and said output electrode with said output; said diode means directing current flow into said input electrode of said transistor regardless of the instantaneous polarity of said AC voltage;
means connected to said output for developing a DC voltage corresponding to the voltage at said output;
a second transistor having an emitter, a collector and a base;
means for producing a sine wave voltage in synchronism with said AC voltage;
means for rectifying said sine wave voltage for producing a DC voltage corresponding to said sine wave voltage;
means connecting said emitter of said second transistor to said DC voltage developing means;
means connecting said base of said second transistor to said rectifying means; and
means connecting said collector of said second transistor to said control electrode of said first transistor whereby the conductivity of said first transistor will be varied in response to variations in voltage at said output and the wave form of said output voltage will follow said sine wave voltage.

11. The circuit of claim 10 wherein means are provided for connecting the collector-emitter path of said second transistor across said first transistor whereby the energizing voltage for said second transistor is derived from the voltage drop across said first transistor.

12. A DC to AC voltage inverter comprising:
a source of DC voltage;
means connected to said source for producing a square wave voltage;
an input for receiving said square wave voltage;
an output;
a first transistor having an input electrode, an output electrode and a control electrode;
diode means connecting said input electrode with said input and said output electrodes with said output, said diode means directing current flow into said input electrode of said transistor regardless of the instantaneous polarity of said square wave voltage;
means connected to said output for developing a DC voltage corresponding to the voltage at said output;
a second transistor having an emitter, a collector and a base;
means for producing a sine wave voltage in synchronism with said square wave voltage;
means for rectifying said sine wave voltage for producing a DC voltage corresponding to said sine wave voltage;
means connecting said emitter of said second transistor to said DC voltage developing means;
means connecting said base of said second transistor to said rectifying means; and
means connecting said collector of said second transistor to said control electrode of said first transistor whereby the conductivity of said first transistor will be varied in response to variations in voltage at said output and the waveform of said output voltage will follow said sine wave voltage.

13. An AC voltage regulating circuit comprising:
a pair of input terminals for receiving an AC voltage;
a pair of output terminals;
a first transistor having an input electrode, an output electrode and a control electrode;
a first diode connecting said input electrode to one of said input terminals, said first diode being poled to pass current into said input electrode when the instantaneous polarity of said AC voltage is positive;
a second diode connecting said input electrode to one of said output terminals, said second diode being poled to pass current into said input electrode when the instantaneous polarity of said AC voltage is negative;
a third diode connecting said output electrode to said one of said input terminals, said third diode being poled to pass current from said output electrode when the instantaneous polarity of said AC voltage is negative;
a fourth diode connecting said output electrode to said one output terminal, said fourth diode being poled to pass current from said output electrode when the instantaneous polarity of said AC voltage is positive;
a transformer having a primary winding connected across said output terminals and a secondary winding;
first rectifying means connected to said secondary winding for producing a DC voltage corresponding to the voltage across said output;
a resistor and a capacitor connected across said first rectifying means;
a second transistor having an emitter, a collector and a base;
a Zener diode connected to said emitter of said second transistor for establishing a reference voltage at said emitter;
means connecting said base of said second transistor to said capacitor;
second rectifying means connected to said secondary winding and to said collector of said second transistor for providing an energizing voltage for said second transistor;
a third transistor having an emitter, a collector and a base;
means connecting said base of said third transistor with said collector of said second transistor;
third rectifying means connected to said secondary winding and to said emitter of said third transistor for providing said emitter with a DC voltage corresponding to the voltage at said output;
means connecting the collector-emitter path of said third transistor across the input electrode-output electrode path of said first transistor whereby the energizing voltage for said third transistor is derived from the voltage drop across said first transistor;
a fourth transistor having an emitter, a collector and a base;
means connecting said collector of said third transistor with said base of said fourth transistor; and
means connecting said collector of said fourth transistor with said control electrode of said first transistor whereby the conductivity of said first transistor will be varied in response to variations in voltage at said output.

14. An AC voltage regulating circuit comprising:
a pair of input terminals for receiving an AC voltage;
a pair of output terminals;
a controlled rectifier having an input electrode, an output electrode and a control electrode;
a first diode connecting said input electrode to one of said input terminals, said first diode being poled to pass current into said input electrode when the instantaneous polarity of said AC voltage is positive;
a second diode connecting said input electrode to one of said output terminals, said second diode being poled to pass current into said input electrode when the instantaneous polarity of said AC voltage is negative;
a third diode connecting said output electrode to said one of said input terminals, said third diode being poled to pass current from said output electrode when the instantaneous polarity of said AC voltage is negative;
a fourth diode connecting said output electrode to said one output terminal, said fourth diode being poled to pass current from said output electrode when the instantaneous polarity of said AC voltage is positive;

a resistor connected between said first and fourth diodes and between said second and third diodes whereby current passes through said resistor when said AC voltage is of either positive or negative instantaneous polarity;

means coupled across said output terminals for developing a DC voltage corresponding to the RMS value of the voltage at said output;

potentiometer means connected across said DC voltage developing means;

a first transistor having an emitter, a collector and a base;

means connecting said base of said first transistor to the wiper of said potentiometer means;

a Zener diode connected to the emitter of said first transistor for establishing a reference potential at said emitter;

resistive means connecting said collector of said first transistor to one side of said resistor;

means connected to the junction of said resistor and said resistive means for providing an energizing voltage for said first transistor;

a second transistor having an emitter, a collector and a base;

means connecting said base of said second transistor to said collector of said first transistor;

means connecting the emitter of said second transistor to the other side of said resistor; and means connecting the collector of said second transistor with the control electrode of said controlled rectifier whereby the firing point of said controlled rectifier will be varied in response to variations in said developed DC voltage.

15. A regulating circuit comprising:
an input for receiving an AC voltage;
an output;
a first transistor having an input electrode, an output electrode and a control electrode;
diode means connecting said input electrode with said input, said diode means directing current flow into said input electrode of said transistor regardless of the instantaneous polarity of said AC voltage;
a transformer having a primary winding connected to said output electrode of said transistor and a secondary winding;
rectifying means connecting said secondary winding to said output;
means connected to said output for developing a DC voltage corresponding to the voltage at said output;
a second transistor having an emitter, a collector and a base;
a Zener diode connected to said emitter of said second transistor for establishing a reference voltage at said emitter;
means connecting the base of said second transistor to said DC voltage developing means;
a third transistor having an emitter, a collector and a base;
means coupling the collector of said second transistor to the third transistor;
means coupled to said primary for producing a DC voltage corresponding to the voltage across said primary;
means coupling the emitter of said third transistor to said DC voltage producing means; and
means connecting the collector of said third transistor to said control electrode of said first transistor whereby the conductivity of said first transistor will be varied in response to variations in voltage at said output.

16. The circuit of claim 15 wherein means are provided for connecting the collector-emitter path of said third transistor across said first transistor whereby the energizing voltage for said third transistor is derived from the voltage drop across said first transistor.

17. An AC voltage regulating circuit comprising:
a pair of input terminals for receiving an AC voltage;
a pair of output terminals;
a first transistor having an input electrode, an output electrode and a control electrode;
a first diode connecting said input electrode to one of said input terminals, said first diode being poled to pass current into said input electrode when the instantaneous polarity of said AC voltage is positive;
a second diode connecting said input electrode to one of said output terminals, said second diode being poled to pass current into said input electrode when the instantaneous polarity of said AC voltage is negative;
a third diode connecting said output electrode to said one of said input terminals, said third diode being poled to pass current from said output electrode when the instantaneous polarity of said AC voltage is negative;
a fourth diode connecting said output electrode to said one output terminal, said fourth diode being poled to pass current from said output electrode when the instantaneous polarity of said AC voltage is positive;
means coupled to said output terminals for developing a voltage corresponding to the voltage at said output;
means coupled to said voltage developing means for rectifying said developed voltage to produce a DC voltage corresponding to the voltage at said output terminals;
potentiometer means connected across said rectifying means;
a second transistor having an emitter, a collector and a base;
means directly connecting said emitter of said second transistor to the wiper of said potentiometer means;
resistor means connecting said base of said second transistor to the wiper of said potentiometer means;
a Zener diode connected to said base of said second transistor for establishing a reference voltage at said base;
means connecting the collector-emitter path of said second transistor across the input electrode-output electrode path of said first transistor whereby the energizing voltage for said second transistor is derived from the voltage drop across said first transistor;
a third transistor having an emitter, a collector and a base;
means connecting said collector of said second transistor with said base of said third transistor;
means connecting said emitter of said third transistor with said input electrode of said first transistor; and
means connecting said collector of said third transistor with said control electrode of said first transistor whereby the conductivity of said first transistor will be varied in response to variations in voltage at said output.

18. The circuit of claim 17 wherein a resistor is connected to the output electrode of said first transistor and wherein a controlled rectifier has its anode-cathode path connected across said first transistor and said resistor and its gate electrode connected to said output electrode.

19. A regulating circuit comprising:
an input for receiving an AC voltage;
an output for delivering an AC voltage;
asymmetrically conducting means;
diode means connecting said asymmetrically conducting means between said input and said output, said diode means directing current flow through said asymmetrically conducting means in the conducting direction thereof regardless of the instantaneous polarity of said AC voltage;
rectifier means connected to said output to develop a DC voltage corresponding to the voltage a said output;

resistance means coupled across said rectifier means;

a transistor having an emitter, a collector and a base;

amplifier means connecting said collector of said transistor to said asymmetrically conducting means to control the conduction thereof;

a Zener diode;

means connecting said emitter of said transistor to a point on said resistance means;

a resistor connecting said emitter and said base of said transistor;

means connecting said Zener diode to said base of said transistor whereby said Zener diode breaks down and conducts when the voltage at said output increases to a predetermined level, further increase of the voltage at said output causing increased conduction of said transistor and consequent decreased conduction of said asymmetrically conducting means.

20. The regulating circuit of claim 19 wherein said asymmetrically conducting means comprises a second transistor having an emitter-collector circuit coupled to said diode means and a base and wherein said amplifier means comprises a third transistor having an emitter-collector circuit coupled to said base of said second transistor and a base coupled to the collector of said transistor.

21. The regulating circuit of claim 19 wherein means are provided for connecting said transistor across said asymmetrically conducting means whereby the energizing voltage for said transistor is derived from the voltage drop across said asymmetrically conducting means.

References Cited

UNITED STATES PATENTS

| | | | |
|---|---|---|---|
| 2,967,991 | 1/1961 | Devitch. | |
| 3,025,451 | 3/1962 | Hakimoglu | 323—9 |
| 3,046,469 | 7/1962 | Young. | |
| 3,106,674 | 10/1963 | Hamilton | 321—18 XR |
| 3,109,979 | 11/1963 | Faulkner. | |
| 3,204,174 | 8/1965 | Clerc | 321—16 XR |
| 3,207,973 | 9/1965 | Smith | 321—18 |
| 3,221,241 | 11/1965 | Greenberg et al. | |
| 3,319,150 | 5/1967 | Elich et al. | 321—18 |
| 3,153,187 | 10/1964 | Klees. | |
| 3,160,808 | 12/1964 | Kruse. | |
| 3,253,209 | 5/1966 | Hordosi. | |
| 3,263,157 | 7/1966 | Klein. | |
| 3,281,652 | 10/1966 | Perrins. | |
| 3,287,623 | 11/1966 | Valancius. | |
| 3,375,428 | 3/1968 | Mitchell | 321—18 |

JOHN F. COUCH, Primary Examiner

W. M. SHOOP, JR., Assistant Examiner

U.S. Cl. X.R.

321—18